United States Patent
Hartlieb et al.

(10) Patent No.: US 7,663,521 B2
(45) Date of Patent: Feb. 16, 2010

(54) OVERSAMPLING PID CONTROLLER FOR INTEGRATION WITH A DELTA-SIGMA ANALOG-TO-DIGITAL CONVERTER

(75) Inventors: Heimo Hartlieb, Graz (AT); Klaus Strohmayer, Graz (AT); Michael Hausmann, Gleisdorf (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 12/051,655

(22) Filed: Mar. 19, 2008

(65) Prior Publication Data

US 2009/0237282 A1    Sep. 24, 2009

(51) Int. Cl.
*H03M 1/00*    (2006.01)

(52) U.S. Cl. ................... 341/142; 341/143
(58) Field of Classification Search ........... 341/142, 341/143, 155; 455/572
See application file for complete search history.

(56) References Cited

U.S. PATENT DOCUMENTS

2004/0036640 A1 * 2/2004 Kawamura .............. 341/143
2006/0172783 A1 * 8/2006 Leung et al. ............ 455/572

* cited by examiner

*Primary Examiner*—Rexford N Barnie
*Assistant Examiner*—Joseph Lauture
(74) *Attorney, Agent, or Firm*—Slater & Matsil, L.L.P.

(57) ABSTRACT

An embodiment of the invention relates to a controller that includes a delta-sigma modulator to produce a one-bit, oversampled signal representing a measured characteristic of a process, and a delta-sigma modulator to produce a one-bit, oversampled signal representing a set-point value for the characteristic. A multiplexer selects a partial sum based on a difference of the oversampled signals to produce a control signal for the process. The controller that produces the control signal for the process can be a PID controller.

23 Claims, 4 Drawing Sheets

OVERSAMPLING PID CONTROLLER FOR INTEGRATION WITH A DELTA-SIGMA ANALOG-TO-DIGITAL CONVERTER

TECHNICAL FIELD

An embodiment of the invention relates generally to digital controllers and methods, and more particularly to a digital controller for providing a control signal employing a delta-sigma modulator.

BACKGROUND

In many state-of-the-art process control applications, a digital controller is used to control an analog process. A digital controller provides cost and performance advantages over corresponding analog controllers that would typically be employed in earlier controller designs. To integrate a digital controller into an analog process control loop, an output value from the analog process to be controlled must be converted into a digital representation in order to serve as an input to the digital controller core.

A control loop including a digital controller can convert an analog process output value ("an output characteristic") into a digital signal using a ΔΣ ADC (delta-sigma analog-to-digital converter). The result of this conversion is subtracted from a desired (digital) set-point value to form a control error signal for a controller such as a proportional-integral-derivative (PID) controller. A PID controller calculates the value of the control signal by digital multiplication of the control error signal (the "process output characteristic" minus the "set-point value") with a constant "KP" representing a proportional weighting coefficient. Next, the PID controller digitally multiplies a derivative of the control error signal with a constant "KD" representing a derivative-weighting coefficient. Then the PID controller digitally multiplies an integral of the control error signal with a constant "KI" representing an integral weighting coefficient. The PID controller then adds these three multiplication results ("partial sums") to produce a digital representation of the control signal. The digital control signal is finally converted to an analog control signal using a digital-to-analog converter. Of course, a controller might only employ one or two multiplication results to produce a control signal.

In many cases the digital controller is implemented in software which runs on a microcontroller, but in some applications it is necessary to implement the controller in dedicated digital hardware. In such cases, multiplication of a control error signal with constants (or variables) KP, KI, and KD in dedicated hardware is very area consuming for a custom integrated semiconductor device, which adds cost to such designs. In digital controllers implemented with a general-purpose digital processor such as a microprocessor, process-intensive computation is the alternative and also the unattractive consequence.

Thus, there is a need for a digital controller structure capable of controlling an analog process that avoids the need for multiplication of a control error signal with a control constant or variable, thereby relieving the need for area-consuming elements or process-intensive computation in an integrated digital circuit.

SUMMARY OF THE INVENTION

In accordance with an exemplary embodiment, a controller for a process and a related method are provided. In an embodiment, the process is an analog process. In an embodiment, the controller includes an analog delta-sigma modulator to produce a first signal representing a measured characteristic of a process, and an analog delta-sigma modulator to produce a second signal representing a set-point value for the characteristic. The controller further includes a summer configured to form a difference of the first and second signals. In an embodiment, the controller further includes a control block comprising a multiplexer that is coupled to the summer and is configured to select a partial sum based on the difference. The control block is further configured to produce a control signal for the process from the partial sum.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views. For a more complete understanding of the invention, reference is now made to the following descriptions taken in conjunction with the accompanying drawings, in which:

DETAILED DESCRIPTION OF ILLUSTRATIVE EMBODIMENTS

Figure 1:
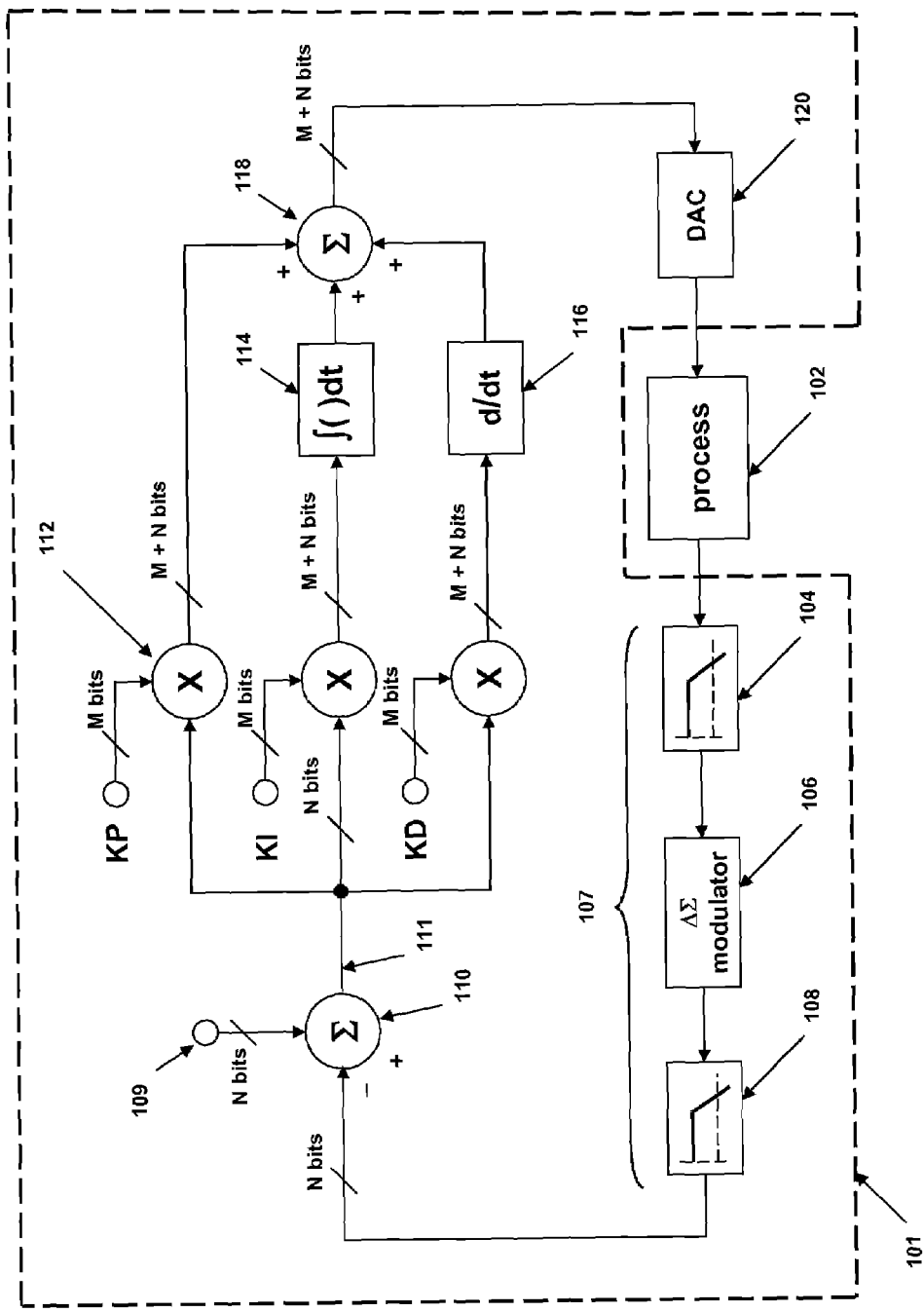
FIG. 1 illustrates a digital PID controller for controlling an analog process, formed employing techniques of the prior art.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely an oversampling PID controller for controlling an analog process. The oversampling PID controller includes a delta-sigma modulator producing a one-bit oversampled signal representing a measured output characteristic of the analog process, a delta-sigma modulator producing a one-bit oversampled signal representing a set-point value for the output characteristic, a summer forming a difference of these signals representing a control error signal, and a control block configured to produce a control signal from the control error signal. Examples of an output characteristic of an analog process include, without limitation, an output voltage of a power supply, a sensed physical parameter of a mechanical system element such as position, velocity, pressure, temperature, etc.

The invention may be applied to various control arrangements for systems including an analog process element controlled by a digital or an analog control signal, or by both, and is not limited to the particular implementations described herein. Other analog processes can be controlled using an oversampling PID controller in different contexts using inventive concepts described herein.

In digital controller designs which include a analog-to-digital converter employing a delta-sigma modulator to digitize the process output signal feedback with common practice to control an analog process, the modulator output of an analog modulator loop inside the ΔΣ ADC is decimated and filtered to produce a multi-bit (N bits wide) digital, down-sampled representation of the process output characteristic. The digital representation of the process output characteristic is subtracted from a desired set-point value (M bits wide) to calculate a control error signal. All multiplications with the proportional, integral, and derivative gain parameters associated with the PID controller, which are computationally intensive, are effectively performed in parallel at the down-sampled sampling rate.

A general description of the operation and use of delta-sigma modulators can be found in the book by R. Schreiner and G. C. Temes, entitled "Understanding Delta-Sigma Data Converters," published by IEEE Press/Wiley Interscience, 2005.

An algorithm performing this digital computation can be implemented in software and run on a microcontroller, but it is computationally inefficient, particularly if a PID-controller is to be implemented in dedicated digital logic, for example, in RTL (resistor-transistor logic). This is necessary, e.g., if a microcontroller is not available in the system or if the resulting software solution is too slow, perhaps due to performance requirements such as a high level of precision for the computation.

Turning now to FIG. 1, illustrated is a representative analog process 102 controlled by a digital implementation of a PID controller 101 formed using commonly known design techniques. An output characteristic of analog process 102 is converted to an N-bit wide digital representation by analog-to-digital converter 107. The analog-to-digital converter includes an analog modulator input filter 104 coupled to a ΔΣ modulator 106, the output of which is decimated by decimation filter 108. The result is to produce an N-bit wide digital signal representing a measured value of the output characteristic of analog process 102. The digitally measured value of the process output characteristic is subtracted from a desired digital set-point value 109 in adder 110 to produce a control error signal 111. The N-bit wide control error signal is separately multiplied by control parameters ("gains") KP, KI, and KD, each M bits wide, in a digital multiplier, such as multiplier 112, to produce digital products that are M+N bits wide. The result of the respective multiplication is digitally integrated in integrator 114, differentiated in differentiator 116, and then added in adder 118 to produce a control signal that is also M+N+I bits wide. In general, the parameter "I" would be determined by the width of the integrator. The control signal is converted to analog form by digital-to-analog converter 120, which is coupled to an analog control input node of process 102, thereby closing a feedback loop around the analog process.

The closed-loop control process illustrated in FIG. 1 includes the computationally intensive multiplication of a multi-bit control error signal by respective multi-bit control gains, such as the gains KP, KI, and KD, and therefore consumes substantial die area for its implementation, or, alternatively, substantial computation in a general-purpose microprocessor. The addition of multi-bit digital signals is generally recognized to be relatively simple by comparison with multi-bit multiplication.

A PID controller, constructed according to an embodiment, utilizes the digital bit-stream nature of a delta-sigma modulator to perform the digital multiplications of the control error signal with proportional, integral, and derivative gain parameters with simple additions, thereby significantly reducing the complexity and die area of the digital controller.

In a PID controller, constructed according to an embodiment, the ΔΣ modulator output, which represents a control signal encoded at the modulator stream's bit rate, is not decimated. Rather, mathematical operations necessary to implement a PID controller algorithm are performed on the encoded signal at its bit rate. First, a desired set-point value, which may be time varying, is converted into a bit stream one bit wide using a digital ΔΣ modulator. The control error signal is calculated by subtracting the control value bit stream from the set-point value bit stream.

Subtraction of two one-bit signals (which can each assume, for example, values of 0 and 1) produces three possible results, namely +1, 0, or −1. The control loop responds to each of these three possibilities. In an alternative embodiment, the result of the subtraction may be represented with a one-bit signal, which omits one of the possibilities. In further alternative embodiments, the subtraction process may produce a multi-bit signal, representing perhaps the result of a wider bit range for the input signals thereto. The narrow encoding of the control error in the bit stream readily accommodates the use of addition (subtraction) instead of multiplication to calculate the control error signal times its respective proportional control constant KP, the integral of the control error signal times its respective control constant KI, and/or the derivative of the control error signal times its respective control constant KD.

The following algorithm can be employed for computation of a control signal in an embodiment, wherein the parameter Kx represents a respective control gain such as KP, KI, or KD:

If the control error signal is +1, the parameter Kx (or a proportional value) is used to calculate the respective partial sum.

If the control error signal is −1, the parameter −Kx (or a proportional value) is used to calculate the respective partial sum.

If the control error signal is 0, the respective partial sum is 0.

The final sum (of the partial sums) can be obtained by simply adding up the partial sums from proportional, integral, and derivative paths. The result is encoded at the modulator stream's bit rate and amplitude. The result may be converted into one or another digital representation, i.e., at a high sampling rate with 1-bit resolution (or with only a few-bits resolution) of signal amplitude, or at a correspondingly lower sampling rate with a more precise, multi-bit representation of signal amplitude.

In an alternative embodiment wherein the result of subtraction of the two one-bit signals is represented with only one bit, the following algorithm can be employed for computation of a control signal. The result of the subtraction is assumed, without limitation, to take binary values of "0" and "1," which can represent negative and positive subtraction results. If the subtraction process produces a positive result, the parameter Kx is used to calculate the partial sum result.

If the subtraction process produces a negative result, the parameter −Kx is used to calculate the partial sum result.

If both input signals to the subtraction process are equal, either a positive or a negative result can be assumed, or it can be randomly selected. In case of random signal selection, the probability of a positive or negative signal is preferably 50%.

Figure 2:
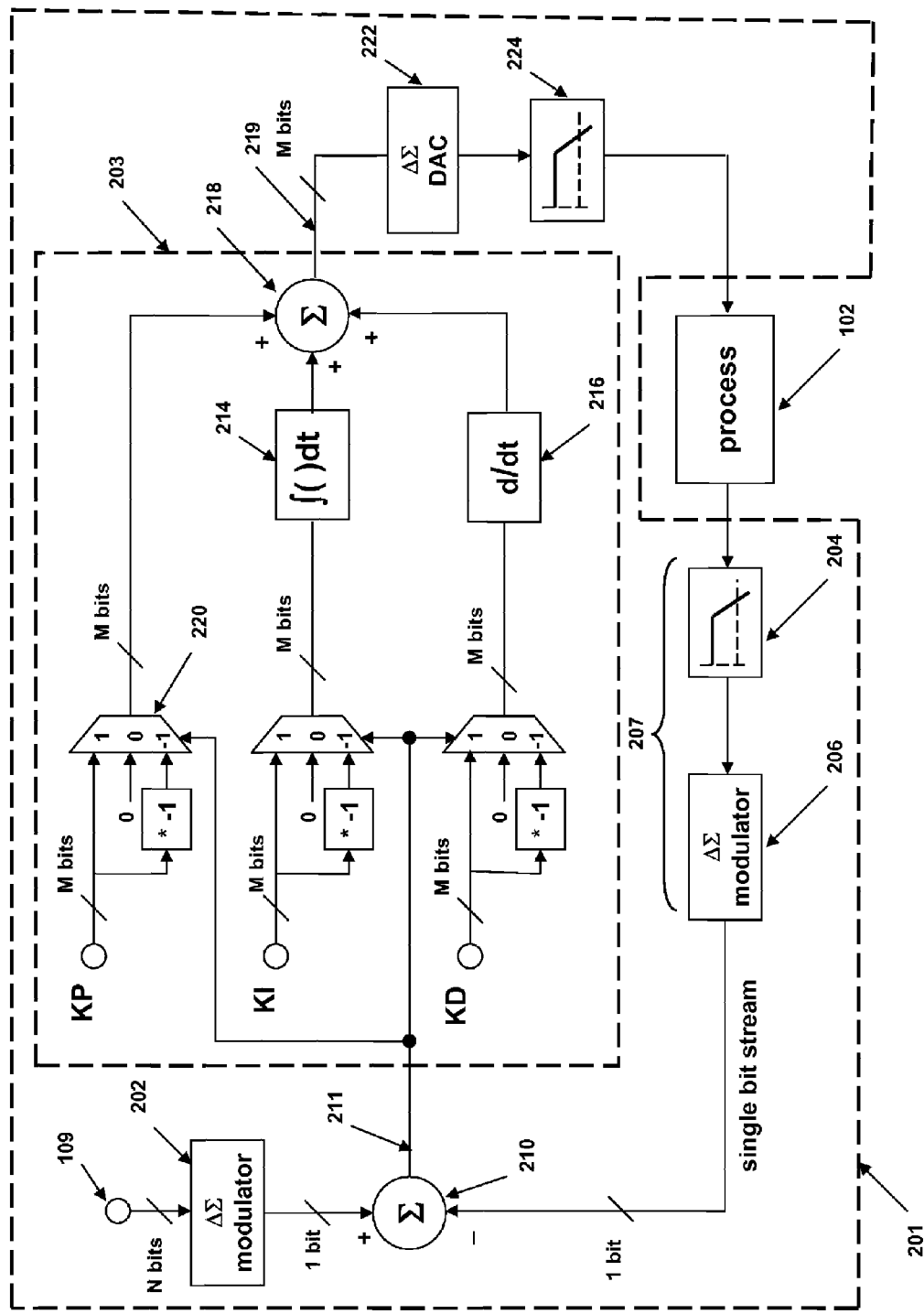
FIG. 2 illustrates an oversampling PID controller for controlling an analog process with an analog control signal, constructed according to an exemplary embodiment.

Turning now to FIG. 2, illustrated is a representative analog process 102 controlled by a digital implementation of a PID controller 201, constructed according to an embodiment. The analog process 102 illustrated in FIG. 2 is controlled by an analog control signal produced by low-pass filter 224. An output signal of process 102 is converted to a one-bit digital representation by analog-to-digital converter 207. The analog-to-digital converter includes an analog modulator input filter 204 coupled to a delta-sigma modulator 206, the output of which is a bit stream, preferably one bit wide, producing thereby a digital signal representing a measured value of the output characteristic of analog process 102. A desired set-point value 109 is converted to a one-bit wide bit stream in $\Delta\Sigma$ modulator 202. The digitally measured value of the process output signal is subtracted from the one-bit wide desired set-point value 109 in adder 210 to produce a control error signal 211, preferably with a value range of [−1, 0, 1]. In an alternative embodiment, the resulting control error signal is a one-bit wide signal with a value range of [0, 1], or with a wider range of values. The control error signal is processed in control block 203 to produce a digital control signal 219. The control error signal is processed in block 203 by logical multiplexers, such as by multiplexer 220, to select M-bit wide digital partial sums corresponding to the control error signal. The control error signal now logically selects multiplexer outputs related to the gains KP, KI, and KD in multiplexers, such as multiplexer 220, to effectively produce digital products that are M bits wide without the need for actual multi-bit digital multiplications. The result of the respective multiplexing is digitally integrated in integrator 214, differentiated in differentiator 216, advantageously also without the need for digital multiplication, to produce partial sums. Digital integration and differentiation can be performed with additions and subtractions, respectively. The partial sums are then added in adder 218 to produce control signal 219 that is also M bits wide. The control signal is converted to analog form by $\Delta\Sigma$ digital-to-analog converter 222, which is coupled to an analog control input node of process 102 through low-pass filter 224, thereby closing a feedback loop around the analog process.

The structure of the digital control process illustrated in FIG. 2 avoids the need for computationally intensive digital multiplications of a many-bit signal by another many-bit signal. Accordingly, its implementation is conservative of die area, producing thereby a cost-effective digital design.

In a typical application as illustrated in FIG. 2, it is likely that an analog PID controller output signal can be directly used as the control signal for the analog process. In this case a $\Delta\Sigma$-DAC modulator is fed directly with the PID controller output to produce an analog control signal. No decimation filter would typically be needed.

Figure 3:
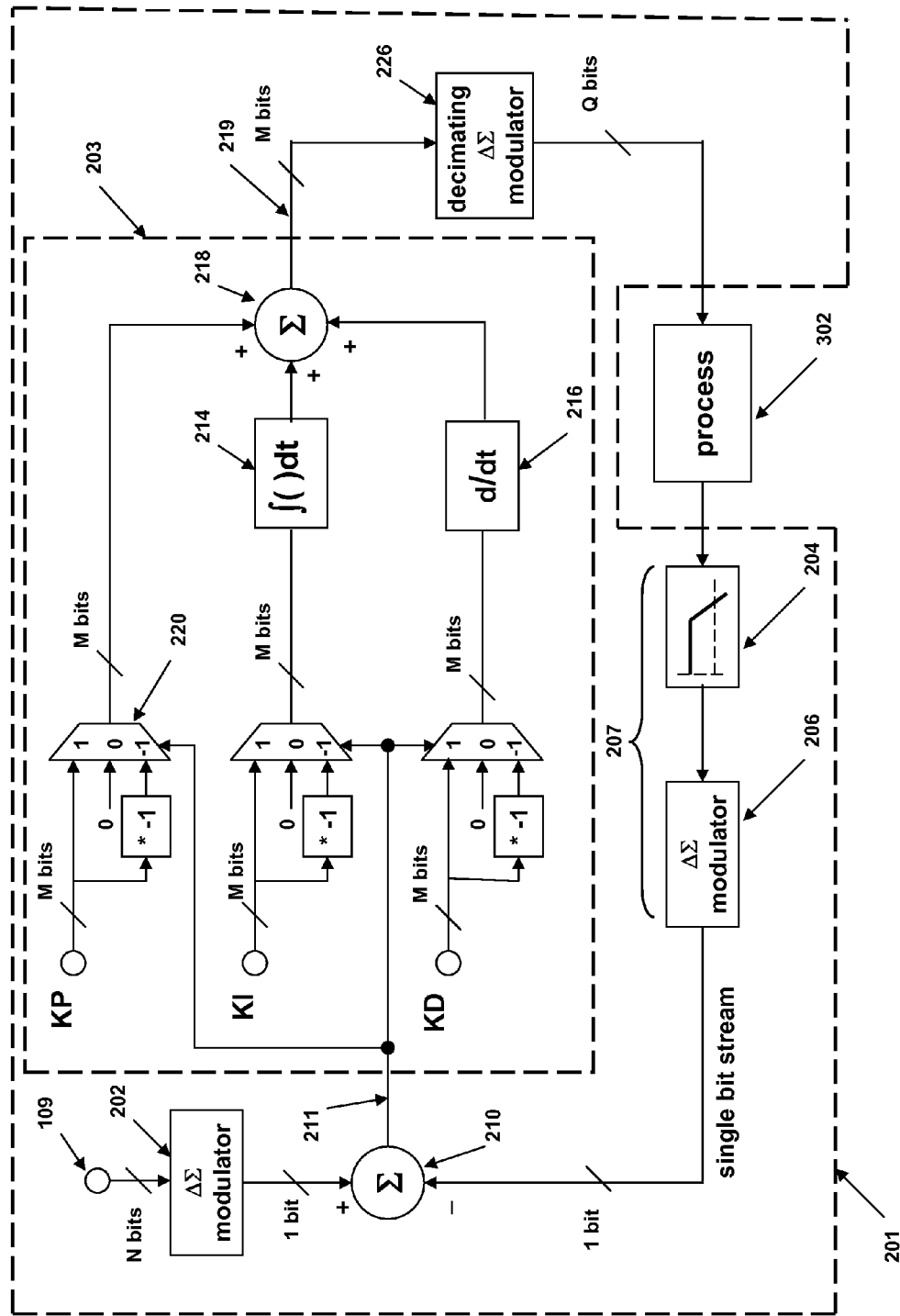
FIG. 3 illustrates an oversampling PID controller for controlling an analog process with a digital control signal, constructed according to an exemplary embodiment.

In an alternative arrangement, if a multi-bit control signal in a digital form is necessary for a particular application, the controller output can be fed as necessary through a decimation filter to generate a signal at a lower sampling rate but at higher resolution. An exemplary control structure, constructed according to an embodiment, is illustrated in FIG. 3. As illustrated in FIG. 3, the sum produced by adder 218, represented in FIG. 3 as a signal M bits wide, is decimated in $\Delta\Sigma$ modulator 226 to produce a digital signal Q bits wide, where Q is greater than M. In an alternative signal-processing arrangement, Q can be less than or equal to M, and at an appropriate sampling rate. Remaining elements in this figure as in other figures with the same element number as a previous figure will not be redescribed in the interest of brevity.

An oversampling PID controller as described hereinabove is fully plug-in-compatible with a conventional digital PID controller. Looking at the width of the signals between the functional blocks illustrated in FIGS. 2 and 3, it can be seen that multipliers are replaced with simple logical multiplexers and adders, and that the input signals of the integrator and the derivative blocks as well as the proportional values are only M bits wide instead of M+N bits wide as depicted for the conventional PID controller illustrated in FIG. 1.

Figure 4:
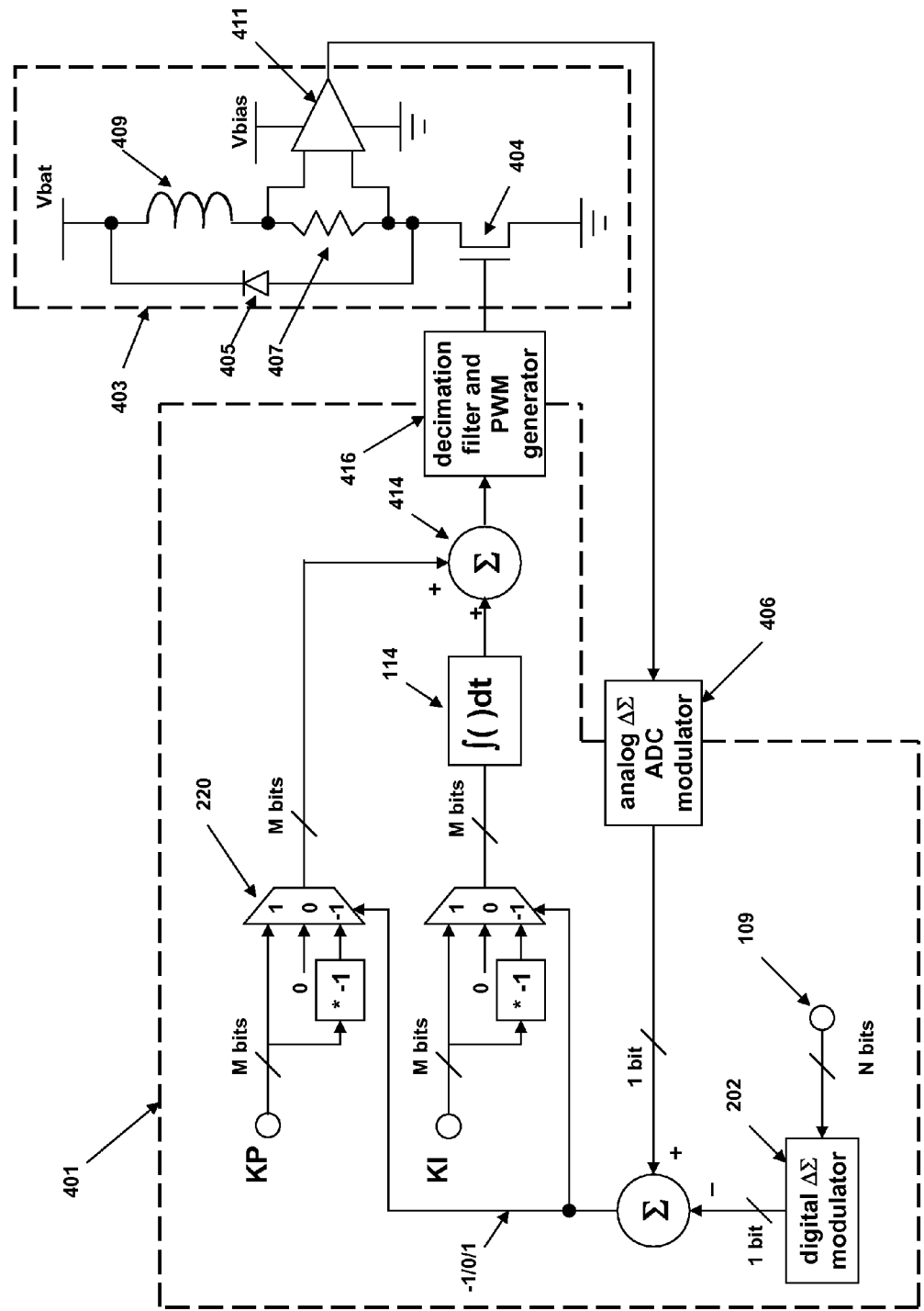
FIG. 4 illustrates an application example of an oversampling PID controller for providing a control feedback signal to a PWM (pulse-width modulated) current control loop, constructed according to an exemplary embodiment.

Turning now to FIG. 4, illustrated is an implementation example showing principal circuit elements of an application circuit 403 representing a switching regulator. In this application, a digital PI (proportional/integral) controller 401, constructed according to an embodiment, is employed to control current through inductive circuit element 409 in the switching regulator. The duty cycle of the control signal generated by a PWM generator 416 determines the average current through the inductive circuit element, which is substantially the same as the average current through sense resistor 407. Generation of a control signal by a PWM generator from a control input thereto employs techniques well known in the art, and will not be further described. The voltage across sense resistor 407 is sensed by differential operational amplifier 411, which is powered from a bias voltage source Vbias. The voltage sensed by operational amplifier 411 provides the input signal to controller 401. The switching regulator further includes transistor switch 404 controlled by an input signal produced by decimation filter and PWM generator 416. Diode 405 provides an alternative current path for the switched current in inductive circuit element 409. The application circuit is powered from voltage source Vbat.

The PI controller 401 converts the voltage sensed across sense resistor 407 into a one-bit wide digital bit stream with analog $\Delta\Sigma$ modulator 406. In an alternative embodiment, controller 401 is a digital controller that includes (1), analog signal conditioning plus signal conversion into the digital domain, (2) the PID controller kernel, and (3), current generation (PWM plus driver). The controller converts the voltage sensed across sense resistor 407 into a one-bit wide digital bit stream with a digital $\Delta\Sigma$ modulator 406. The PI controller algorithm works as described above with reference to FIG. 2, omitting the derivative computation in the feedback loop, and including decimation filter and PWM generator 416. Summation of two "partial sums," one a proportional partial sum produced in multiplexer 220, and one an integrated partial sum produced in integrator block 114, is performed in summer 414. Decimation of the PI controller output and generation of the PWM signal represents digital-to-analog conversion. Accordingly, current in inductive circuit element 409 is efficiently controlled by a digital control process employing a feedback loop without the need for computationally intensive multiplication.

Reduction of semiconductor chip area can be obtained in an embodiment due to simplification of PID digital arithmetic. In addition, reduced EMC radiation can be obtained as a result of less operating logic per clock period, because the circuitry between two registers is simplified. In a controller constructed according to common practice, the clock frequency would have to be lower, but the logic between registers would be a lot more complex. In addition, a decimation filter can be omitted if a delta-sigma modulator is used for digital-to-analog conversion.

For a conventional digital controller, there are current peaks each time PWM duty cycle is recalculated, which recur once each PWM cycle. An oversampling current controller, constructed according to an embodiment, runs at the same frequency as the included $\Delta\Sigma$ modulators. Therefore, there are no current peaks once a PWM period. Current consumption is accordingly more evenly distributed over the PWM period.

The concept has been introduced of measuring a characteristic of an analog process with a delta-sigma modulator to produce a bit stream, such as a one-bit wide stream, representing the measured characteristic. In an embodiment, the measured characteristic is oversampled. A digital controller advantageously can be implemented without the need for multiplication of a many-bit parameter by another many-bit parameter.

In accordance with one exemplary embodiment, a controller includes an analog-to-digital converter employing a delta-sigma modulator, the analog-to-digital converter configured to produce a first signal representing a measured characteristic of a process. The process, without limitation, would typically be an analog process. In a preferred embodiment, an analog-to-digital converter employing a delta-sigma modulator is configured to produce a second signal representing a set-point value for the characteristic, and a summer is configured to form a difference of the first and second signals. A control block including a multiplexer is coupled to the summer and is configured to select a partial sum from the difference. The control block is configured to produce a control signal for the process from the partial sum. In an embodiment, the first signal is a one-bit signal. In an embodiment, the second signal is a one-bit signal. In a further embodiment, the first signal is an oversampled signal. In an embodiment, the controller is a PID controller, but other control arrangements are anticipated within the broad scope of the invention. In an embodiment, the controller produces an analog control signal for the process. In a further embodiment, the controller comprises a delta-sigma modulator coupled to the control block to produce the control signal for the process. In a further embodiment, a delta-sigma modulator produces a decimated digital signal for the control signal.

Another exemplary embodiment provides a method of controlling a process. In an embodiment, the process comprises an analog process. In an embodiment, the method includes producing a first digital signal representing a measured characteristic of the analog process, and a second digital signal representing a set-point value for the characteristic of the analog process. In an embodiment, the method includes producing the first digital signal with a delta-sigma modulator. In an embodiment, the method includes producing the second digital signal with a delta-sigma modulator. The method further includes forming a difference of the first and second signals, and selecting a partial sum based on the difference. The method further includes producing a control signal for the process from the partial sum. In an embodiment, the method includes forming a one-bit signal for the first signal. In an embodiment, the method includes forming a one-bit signal for the second signal. In a further embodiment, the first signal comprises an oversampled signal. In an embodiment, the method includes producing the partial sum employing at least one selected from the group consisting of a proportional, an integral, and a differential operation. In an embodiment, the control signal is an analog control signal. In an embodiment, the method further includes employing a delta-sigma modulator to produce the control signal for the process from the partial sum. In an embodiment, the method further includes producing a decimated digital signal to control the process Another exemplary embodiment provides an electronic system including an analog-to-digital converter configured to produce a first signal representing a measured characteristic of the electronic system, and an analog-to-digital converter configured to produce a second signal representing a set-point value for the characteristic. In an embodiment, the analog-to-digital converter configured to produce the first signal includes a delta-sigma modulator. In an embodiment, the analog-to-digital converter configured to produce the second signal includes a delta-sigma modulator. In an embodiment, the first signal is a one-bit signal. In an embodiment, the second signal is a one-bit signal. The electronic system further includes a summer configured to select a difference of the first and second signals, and a control block comprising a multiplexer. In an embodiment, the multiplexer is coupled to the summer and is configured to form a partial sum from the difference. The control block is configured to produce a control signal for the electronic system from the partial sum.

Although a controller and related methods have been described for application to control a process including a digital process, it should be understood that other applications of a controller are contemplated within the broad scope of the invention, and need not be limited to process-control arrangements.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A controller, comprising:
    a delta-sigma modulator configured to produce a first signal representing a measured characteristic of a process;
    a delta-sigma modulator configured to produce a second signal representing a set-point value for said characteristic;
    a summer configured to form a difference of said first and said second signal; and
    a control block comprising a multiplexer, said multiplexer coupled to said summer and configured to select a partial sum from said difference, said control block configured to produce a control signal for said process from said partial sum.

2. The controller as claimed in claim 1, wherein said first signal comprises a one-bit signal.

3. The controller as claimed in claim 1, wherein said second signal comprises a one-bit signal.

4. The controller as claimed in claim 1, wherein said first signal comprises an oversampled signal.

5. The controller as claimed in claim 1, wherein said controller comprises a PID controller.

6. The controller as claimed in claim 1, wherein said controller produces an analog control signal for said process.

7. The controller as claimed in claim 1, wherein said controller further comprises a delta-sigma modulator coupled to said control block to produce said control signal for said process.

8. The controller as claimed in claim 7, wherein said delta-sigma modulator produces a decimated digital signal for said control signal.

9. The controller as claimed in claim 1, wherein:
    said first signal comprises a one-bit signal;
    said second signal comprises a one-bit signal; and
    said first signal comprises an oversampled signal.

10. The controller as claimed in claim 9, wherein said controller comprises a PID controller.

11. A method of controlling an analog process, the method comprising:

producing a first digital signal with a delta-sigma modulator representing a measured characteristic of said analog process;

producing a second digital signal with a delta-sigma modulator representing a set-point value for said characteristic of said analog process;

forming a difference of said first signal and said second signal;

selecting a partial sum based on said difference; and producing a control signal for said process from said partial sum.

12. The method as claimed in claim 11, wherein said first signal comprises a one-bit signal.

13. The method as claimed in claim 11, wherein said second signal comprises a one-bit signal.

14. The method as claimed in claim 11, wherein said first signal comprises an oversampled signal.

15. The method as claimed in claim 11, including producing said partial sum employing at least one selected from the group consisting of a proportional, an integral, and a differential operation.

16. The method as claimed in claim 11, wherein said control signal is an analog control signal.

17. The method as claimed in claim 11, further including employing a delta-sigma modulator to produce said control signal for said process from said partial sum.

18. The method as claimed in claim 17, further including producing a decimated digital signal to control said process.

19. An electronic system, comprising:

an analog-to-digital converter comprising a delta-sigma modulator configured to produce a first signal representing a measured characteristic of said electronic system;

an analog-to-digital converter comprising a delta-sigma modulator configured to produce a second signal representing a set-point value for said characteristic;

a summer configured to form a difference of said first and said second signal; and a control block comprising a multiplexer, said multiplexer coupled to said summer and configured to select a partial sum based on said difference, said control block configured to produce a control signal for said electronic system from said partial sum.

20. The electronic system as claimed in claim 19, wherein said first signal comprises a one-bit signal.

21. The electronic system as claimed in claim 19, wherein said second signal comprises a one-bit signal.

22. The electronic system as claimed in claim 19, wherein said controller further comprises a delta-sigma modulator coupled to said control block to produce said control signal for said process.

23. The electronic system as claimed in claim 19, wherein:

said first signal comprises a one-bit signal;

said second signal comnpmises a one-bit signal; and said controller comprises a PID controller.

* * * * *